United States Patent
Zhang et al.

(10) Patent No.: US 11,175,824 B2
(45) Date of Patent: Nov. 16, 2021

(54) METHOD FOR DETECTING AMBIENT LIGHT INTENSITY, STORAGE MEDIUM AND ELECTRONIC DEVICE

(71) Applicant: GUANGDONG OPPO MOBILE TELECOMMUNICATIONS CORP., LTD., Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 17 days.

(21) Appl. No.: 16/135,543

(22) Filed: Sep. 19, 2018

(65) Prior Publication Data

US 2019/0155501 A1    May 23, 2019

(30) Foreign Application Priority Data

Nov. 22, 2017 (CN) .......................... 201711176966.0

(51) Int. Cl.
*G06F 3/048*      (2013.01)
*G06F 3/0488*      (2013.01)
(Continued)

(52) U.S. Cl.
CPC ...... *G06F 3/04886* (2013.01); *G06F 3/04847* (2013.01); *G09G 3/20* (2013.01);
(Continued)

(58) Field of Classification Search
CPC ... G06F 3/04886; G06F 3/04847; G09G 3/20; G09G 3/3406; G09G 2320/0626; G09G 2360/144; G09G 2360/145
See application file for complete search history.

(56) References Cited

U.S. PATENT DOCUMENTS

2011/0096084 A1\*   4/2011   Hu ........................ G09G 3/3413
                                                     345/589
2014/0057683 A1\*   2/2014   Li .......................... H04M 1/22
                                                     455/566
(Continued)

FOREIGN PATENT DOCUMENTS

CN          102265707        11/2011
CN          103137100         6/2013
(Continued)

OTHER PUBLICATIONS

EPO, Office Action for EP Application No. 18198171, dated Dec. 21, 2018.
(Continued)

*Primary Examiner* — Tadesse Hailu
*Assistant Examiner* — Asteway T Gattew
(74) *Attorney, Agent, or Firm* — Hodgson Russ LLP (57) ABSTRACT

The present disclosure provides a method for detecting ambient light intensity, a storage medium and an electronic device. The method for detecting ambient light intensity includes: controlling a preset region of a display screen of an electronic device to display a predetermined picture; obtaining an ambient light intensity value detected by the ambient light sensor; and controlling the display screen to respond according to the ambient light intensity value. The preset region is a region facing an ambient light sensor in the display screen. The predetermined picture is a pure color picture.

15 Claims, 5 Drawing Sheets

(51) Int. Cl.
  *G09G 3/20* (2006.01)
  *G06F 3/0484* (2013.01)
  *G09G 3/34* (2006.01)

(52) U.S. Cl.
  CPC ... *G09G 3/3406* (2013.01); *G09G 2320/0626* (2013.01); *G09G 2360/144* (2013.01); *G09G 2360/145* (2013.01)

(56) References Cited

U.S. PATENT DOCUMENTS

| | | | | |
|---|---|---|---|---|
| 2014/0132578 | A1* | 5/2014 | Zheng | G09G 5/10 345/207 |
| 2014/0168288 | A1* | 6/2014 | Tusch | G09G 5/00 345/690 |
| 2015/0085155 | A1* | 3/2015 | Diaz Spindola | H04N 9/3176 348/222.1 |
| 2015/0287383 | A1* | 10/2015 | Kim | G09G 3/20 345/204 |
| 2016/0100140 | A1* | 4/2016 | Hsiao | H04N 9/3182 353/85 |
| 2016/0253944 | A1* | 9/2016 | Lu | G09G 3/3413 345/589 |
| 2018/0274974 | A1* | 9/2018 | Wang | G09G 3/3208 |
| 2020/0118521 | A1* | 4/2020 | Facchin | G09G 3/20 |

FOREIGN PATENT DOCUMENTS

| | | |
|---|---|---|
| CN | 106462339 | 2/2017 |
| CN | 106679803 | 5/2017 |
| CN | 107957294 | 4/2018 |
| CN | 107990978 | 5/2018 |
| EP | 3346459 | 7/2018 |
| GN | 108021161 | 5/2018 |
| JP | 4241702 | 3/2009 |
| JP | 4702263 | 6/2011 |
| KR | 20140143526 | 12/2014 |
| KR | 20150064528 | 6/2015 |
| TW | 201115216 | 5/2011 |
| WO | 2017054108 | 4/2017 |

OTHER PUBLICATIONS

WIPO, English translation of the ISR and WO for PCT/CN2018/108350, dated Jan. 11, 2019.
IPO, Office Action for IN Application No. 201814036769, dated Mar. 9, 2020.
EPO, Communication for EP Application No. 18198171.3, dated Jul. 22, 2020.
SIPO, Rejection Decision for CN Application No. 201711176966.0, dated Aug. 19, 2020.
IP Australia, Examination Report for AU Application No. 2018370704, dated Mar. 1, 2021.
IP Australia, Examination Report for AU Application No. 2018370704, dated Dec. 17, 2020.

* cited by examiner

Fig. 1

| |
|---|
| controlling a preset region of a display screen of an electronic device to display a predetermined picture, wherein the preset region is a region facing an ambient light sensor of the electronic device in the display screen, and the predetermined picture is a pure color picture — S110 |
| obtaining an ambient light intensity value detected by the ambient light sensor — S120 |
| controlling the display screen to respond according to the ambient light intensity value — S130 |

Fig. 4 controlling a preset region of a display screen of an electronic device to display a predetermined picture, wherein the preset region is a region facing an ambient light sensor of the electronic device in the display screen, and the predetermined picture is a pure color picture — S110 obtaining an ambient light intensity value detected by the ambient light sensor — S120 obtaining a preset adjustment value of ambient light intensity according to a color of the predetermined picture — S133 calculating a difference value between the ambient light intensity value and the preset adjustment value of ambient light intensity — S1341 controlling the display screen to respond according to the difference value — S1351

METHOD FOR DETECTING AMBIENT LIGHT INTENSITY, STORAGE MEDIUM AND ELECTRONIC DEVICE

CROSS-REFERENCE TO RELATED APPLICATIONS

This application is based on and claims priority to Chinese Patent Application No. 201711176966.0, filed on Nov. 22, 2017, the entire contents of which are incorporated herein by reference.

FIELD

The present disclosure relates to an electronic device technology field, and more particularly to a method for detecting ambient light intensity, a storage medium and an electronic device.

BACKGROUND

With rapid development of electronic technology, electronic devices such as smart phones and tablet computers have become more and more popular. Electronic devices such as smart phones and tablet computers have display screens.

Generally, an ambient light sensor is disposed under the display. The ambient light sensor is used to detect the ambient light intensity, so that the electronic device can control the brightness of the display screen according to the detected ambient light intensity, thus the brightness of the display screen is adapted to the external environment.

SUMMARY

Embodiments of the present disclosure provide a method for detecting ambient light intensity. The method for detecting ambient light intensity includes: controlling a preset region of a display screen of an electronic device to display a predetermined picture; obtaining an ambient light intensity value detected by the ambient light sensor; and controlling the display screen to respond according to the ambient light intensity value. The preset region is a region facing an ambient light sensor in the display screen. The predetermined picture is a pure color picture.

Embodiments of the present disclosure provide a storage medium, having stored therein one or more computer programs, when the one or more computer programs is performed by a computer, the computer is configured to perform a method for detecting ambient light intensity. The method for detecting ambient light intensity includes: controlling a preset region of a display screen of an electronic device to display a predetermined picture; obtaining an ambient light intensity value detected by the ambient light sensor; and controlling the display screen to respond according to the ambient light intensity value. The preset region is a region facing an ambient light sensor in the display screen. The predetermined picture is a pure color picture.

Embodiments of the present disclosure provide an electronic device. The electronic device includes: a display screen, including a display region; an ambient light sensor, disposed facing the display region of the display screen; and a processor, configured to control a preset region of the display screen to display a predetermined picture when the ambient light sensor detects ambient light intensity. The preset region is a region facing the ambient light sensor in the display screen. The predetermined picture is a pure color picture.

BRIEF DESCRIPTION OF THE DRAWINGS

In order to illustrate the technical solutions of embodiments of the present disclosure more clearly, the accompanying drawings used in the description of embodiments of the present disclosure are briefly described hereunder. Obviously, the described drawings are merely some embodiments of present disclosure. For those skilled in the art, other drawings may be obtained based on these drawings without any creative work.

DETAILED DESCRIPTION

The technical solutions in embodiments of the present disclosure are hereinafter described clearly and completely with reference to the accompanying drawings in embodiments of the present disclosure. It should be understood that, embodiments described herein are a part of embodiments of the present disclosure, but not all. Based on embodiments of the present disclosure, all other embodiments obtained by those skilled in the art without creative work should fall within the scope of the present disclosure.

Terms of "first", "second", "third", etc. (if exist) in the specification, claims and above mentioned accompanying drawings of the present disclosure are used to distinguishing similar objects and are not necessarily used to describe a particular order or prioritization. It should be understood that the objects so described are interchangeable where appropriate. In addition, terms of "comprise", "comprising" and any other variants thereof are intended to cover non-exclusive contains. For example, the processes or methods including a series of steps, or apparatus, electronic devices, or systems including s series of modules or units are not necessarily limited to those steps or modules or units that are clearly listed, may include steps or modules or units that are not explicitly listed, and may also include other steps or modules or units inherent to such processes, methods, apparatus, electronic devices or systems.

Figure 1:
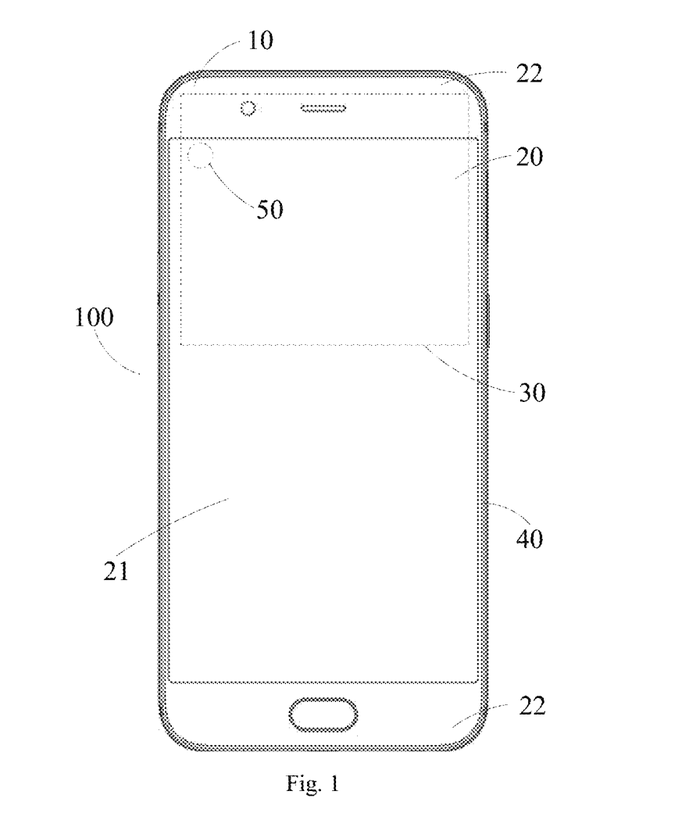
FIG. 1 is a schematic diagram of an electronic device according to an embodiment of the present disclosure.

FIG. 1 is a schematic diagram of an electronic device according to an embodiment of the present disclosure. As illustrated in FIG. 1, electronic device 100 includes a cover plate 10, a display screen 20, a circuit board 30, a housing 40 and an ambient light sensor 50 mounted inside the housing 40.

The cover plate 10 is mounted on the display screen 20 to cover the display screen 20. The cover plate 10 may be a transparent glass cover plate. In some embodiments, the cover plate 10 may be a glass cover plate made of a material such as a sapphire.

The display screen 20 is mounted on the housing 40 to form a display surface of the electronic device 100. In some embodiments, the display screen 20 includes a display region 21 and a non-display region 22. The display region 21 is configured to display information such as images and text. The non-display region 22 does not display information. The non-display region 22 may be configured to set some functional components, such as a camera, a fingerprint recognition module, or other functional components.

In some embodiments, the display screen 20 may display in the whole display screen, that is, the display screen 20 includes the display region 21 only, and does not include the non-display region.

In some embodiments, the display screen 20 may be a liquid crystal display (LCD) or an organic light-emitting diode (OLED).

The circuit board 30 is mounted inside the housing 40. The circuit board 30 may be a motherboard of the electronic device 100. The circuit board 30 may be integrated with functional components such as a camera, a processor and so on. Meanwhile, the display screen 20 may be electrically coupled to the circuit board 30.

In some embodiments, the circuit board 30 has a display control circuit. The display control circuit outputs an electrical signal to the display screen 20 to control the display screen 20 to display information.

The housing 40 is configured to form an external contour of the electronic device 100. A material of the housing 40 may be plastic or metal. The housing 40 may be integrally molded.

The ambient light sensor 50 is mounted inside the housing 40. Meanwhile, the ambient light sensor 50 is electrically coupled to the circuit board 30. For example, the ambient light sensor 50 may be integrated on the circuit board 30. The ambient light sensor 50 is configured to detect ambient light intensity, such that the electronic device 100 may adjust brightness of the display screen 20 according to the ambient light intensity detected by the ambient light sensor 50, thus the brightness of the display screen 20 is adapted to surrounding environment. For example, in a dark environment, the electronic device 100 may lower the brightness of the display screen 20, and in a bright environment, the electronic device 100 may improve the brightness of the display screen 20.

In an embodiment of the present disclosure, the ambient light sensor 50 may be disposed just facing the display region 21 in the display screen 20. That is, an orthographic projection on the display screen 20 of the ambient light sensor 50 is located in the display region 21 of the display screen 20. It should be understood that, at this time, the ambient light sensor 50 collects external environment light through the display region 21 of the display screen 20 to detect ambient light intensity. That is, the external environment light enters the ambient light sensor 50 through the display region 21 of the display screen 20.

In some embodiments, the ambient light sensor 50 may be disposed facing an edge of the display region 21 of the display screen 20. For example, the ambient light sensor 50 may be disposed facing an upper edge, a lower edge, a left edge, a right edge, or the like of the display region 21.

In some embodiments, the display region 21 of the display screen 20 may be a rectangular region. The ambient light sensor 50 may be disposed facing a top left corner, a lower left corner, a top right corner, a lower right corner, or the like of the display region 21.

Embodiments of the present disclosure provide a method for detecting ambient light intensity. The method for detecting ambient light intensity may be applicable in an electronic device. The electronic device may be a smart phone, a tablet computer, or the like. The electronic device may be the electronic device 100 in any one of above mentioned embodiments.

Figure 2:
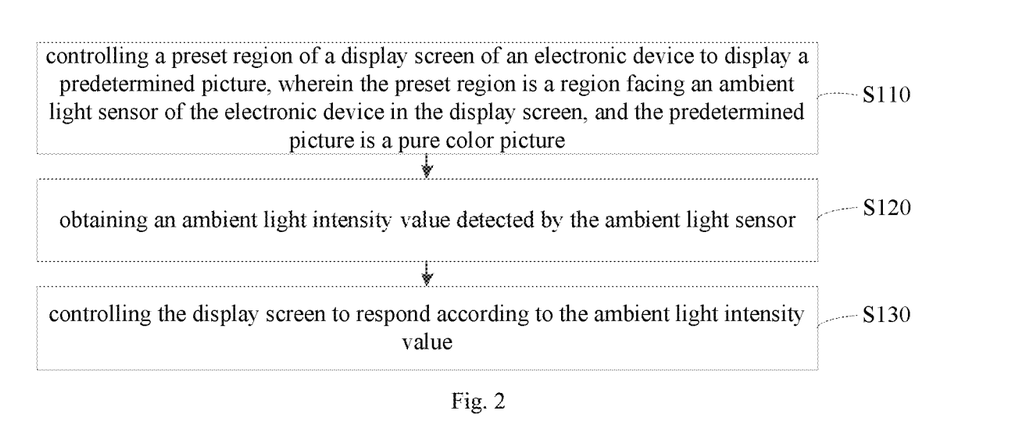
FIG. 2 is a flow chart of a method for detecting ambient light intensity according to an embodiment of the present disclosure.

As illustrated in FIG. 2, the method for detecting ambient light intensity may include actions illustrated in following blocks.

At block S110, a preset region of the display screen is controlled to display a predetermined picture. The preset region is a region facing the ambient light sensor in the display screen, and the predetermined picture is a pure color picture.

Figure 6:
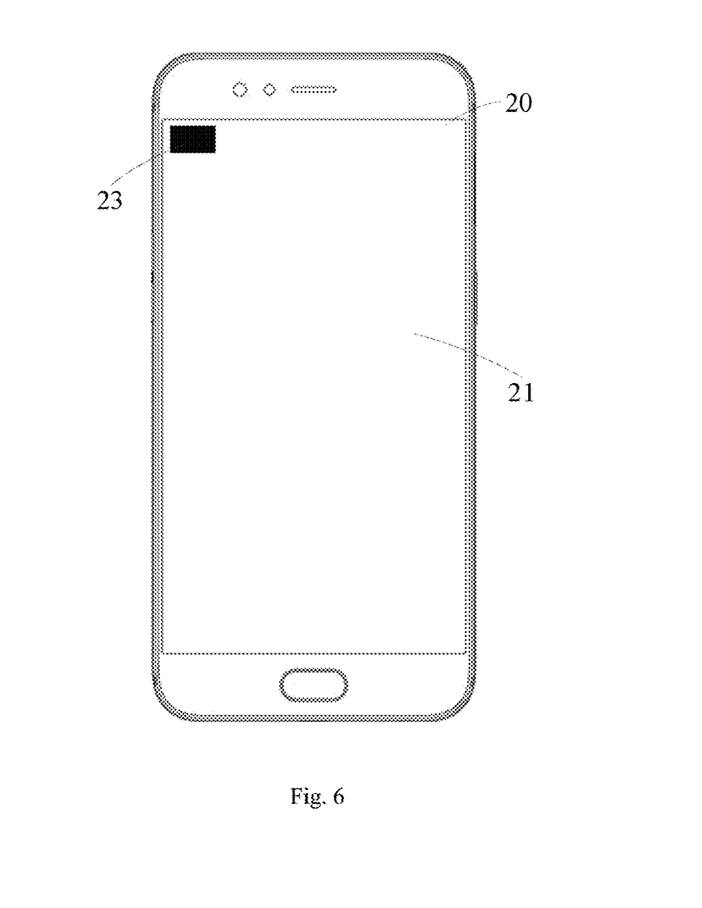
FIG. 6 is a schematic diagram of an application scene of a method for detecting ambient light intensity according to an embodiment of the present disclosure.

The preset region may be preset on the display screen of the electronic device. The preset region is the region facing the ambient light sensor in the display screen. For example, as illustrated in FIG. 6, the display region 21 of the display screen includes the preset region 23. The preset region 23 may be located at the top left corner of the display region 21. At this time, the ambient light sensor in the electronic device is set facing the preset region 23. In some embodiment, the preset region may also be located at other position in the display region 21.

The electronic device may control the display region of the display screen to display the predetermined picture. The predetermined picture is an image or a partial image preset in the electronic device. Color of any two points in the predetermined picture is the same. That is, the predetermined picture is a pure color picture, and color of all parts of the predetermined picture is the same. In some embodiments, the predetermined picture may be a full black image, and the color of the predetermined picture is black, as illustrated in FIG. 6.

In some embodiments, the electronic device may control the preset region of the display screen to display the predetermined picture when there is a need to detect the ambient light intensity. That is, the electronic device may control the preset region of the display screen to display the predetermined picture in response to a triggering event, such as a user instruction, a time point and so on. In some embodiments, the electronic device may also control the preset region of the display screen to display the predetermined picture all the time.

At block S120, an ambient light intensity value detected by the ambient light sensor is obtained.

When the preset region of the display screen of the electronic device displays the predetermined picture, the electronic device may control the ambient light sensor to detect a current ambient light intensity value. The electronic device obtains the ambient light intensity value detected by the ambient light sensor.

It should be understood that, when the ambient light sensor detects the ambient light intensity value, external environment light (i.e., visible light) enters the ambient light sensor through the display region of the display screen. When the display region of the display screen displays information, the display screen itself is also illuminated, and light emitted by the display screen is also visible light. The light emitted by the display screen may also enter the ambient light sensor, thus affecting detection result of the ambient light sensor.

It should be understood that, comparing with a situation that the predetermined picture includes a plurality of colors, the preset region of the display screen emits less light when the predetermined picture displayed by the preset region is a pure color picture. When the pure color picture is a full black picture, i.e., the pure color picture is a pure black picture, the preset region of the display screen emits the least amount of light, so that the display screen has the least influence on the ambient light sensor.

When the electronic device controls the preset region of the display screen to display the predetermined picture, such as a black picture, the light emitted by the preset region may be minimized to enter the ambient light sensor. Thereby, the influence of the display screen on the ambient light sensor can be reduced, and the accuracy of the ambient light sensor detection can be improved.

At block S130, the display screen is controlled to respond according to the ambient light intensity value.

After the electronic device obtains the ambient light intensity value detected by the ambient light sensor, light intensity of external environment may be determined according to the ambient light intensity value. The electronic device may control the display screen to respond according to the ambient light intensity value. For example, the electronic device may control brightness of the display screen according to the light intensity of external environment, such that the brightness of the display screen is adapted to the external environment light.

Figure 3:
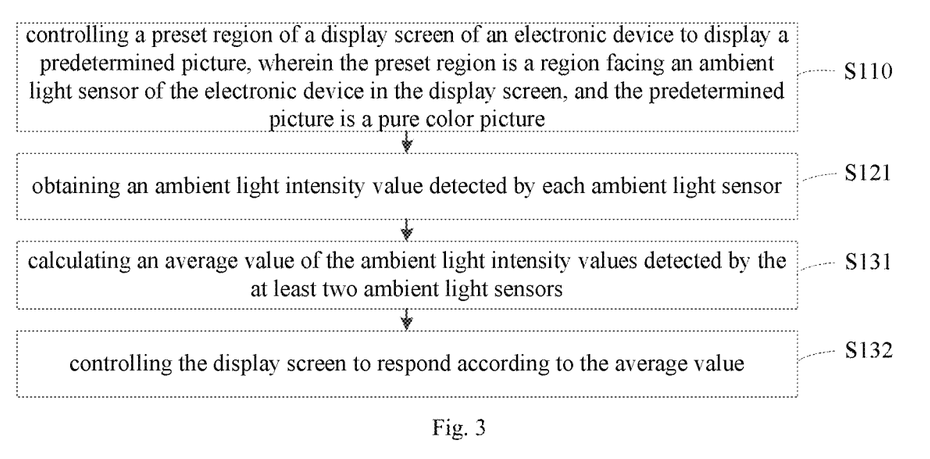
FIG. 3 is a flow chart of a method for detecting ambient light intensity according to another embodiment of the present disclosure.

In some embodiments, the number of the ambient light sensor may be at least two. The at least two ambient light sensors may be spaced apart from each other. As illustrated in FIG. 3, obtaining the ambient light intensity value detected by the ambient light sensor at block S120 may include actions illustrated in following blocks.

At block 121, an ambient light intensity value detected by each ambient light sensor is obtained.

Controlling the display screen to respond according to the ambient light intensity value at block 130 may include follows.

At block 131, an average value of the ambient light intensity values detected by the at least two ambient light sensors is calculated.

At block 132, the display screen is controlled to respond according to the average value.

Figure 7:
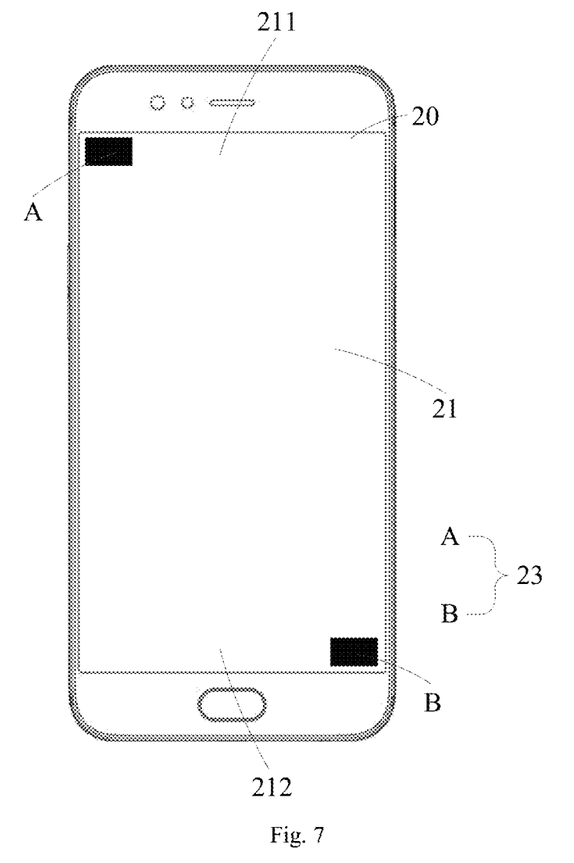
FIG. 7 is a schematic diagram of another application scene of a method for detecting ambient light intensity according to an embodiment of the present disclosure.

The electronic device includes at least two ambient light sensors. The at least two ambient light sensors are spaced apart from each other. As illustrated in FIG. 7, the preset region 23 of the display screen 20 at least includes region A and region B. One of two ambient light sensors is disposed facing region A, and the other one of the two ambient light sensors is disposed facing region B.

The electronic device may obtain an ambient light intensity value detected by each ambient light sensor. The electronic device calculates the average value of the ambient light intensity values detected by the at least two ambient light sensors, and controls the display screen to respond according to the average value.

For example, the intensity values of the two ambient light sensors are 70 and 80. The average value of the intensity values of the two ambient light sensors is 75. The electronic device determines the ambient light intensity according to the average value 75. For example, the ambient light intensity is determined as the average value 75. The electronic device controls the display screen to respond according to the average value, for example, reducing brightness of the display screen.

In some embodiments, the number of the ambient light sensors included in the electronic device may be three, four or other number. The plurality of ambient light sensor included in the electronic device are spaced apart from each other.

In some embodiments, as illustrated in FIG. 7, the display region 21 of the display screen 20 includes a first part 211 and a second part 212 disposed oppositely. It should be understood that, the first part 211 may locate at the top of the display screen 20, and a second part 212 may locate at the bottom of the display screen 20. One of the two ambient light sensors included in the electronic device may be disposed facing an edge of the first part 211, and the other one may be disposed facing an edge of the second part 212. For example, one of the two ambient light sensors included in the electronic device may be disposed facing the top left corner, and the other one may be disposed facing the lower right corner of the display region 21.

Figure 4:
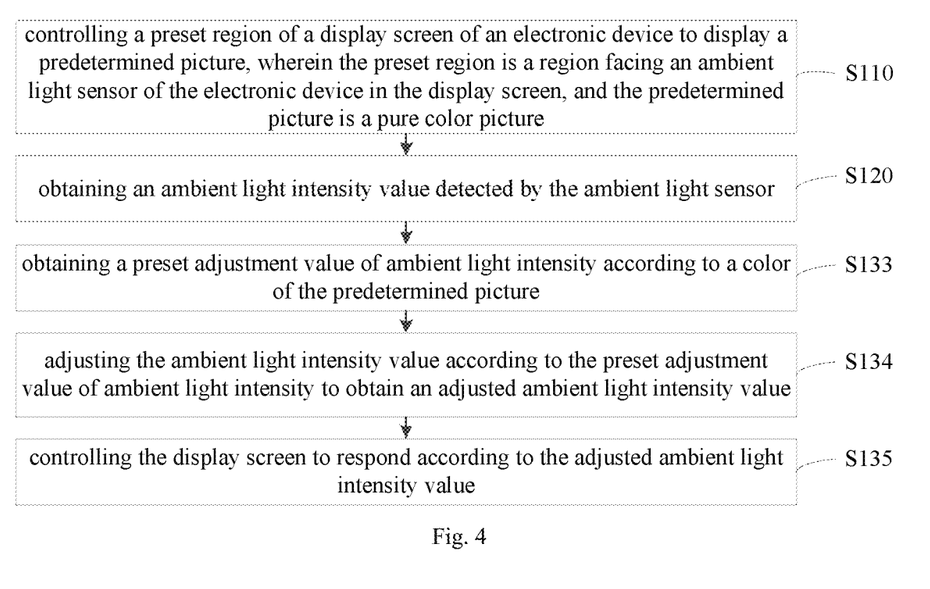
FIG. 4 is a flow chart of a method for detecting ambient light intensity according to another embodiment of the present disclosure.

In some embodiments, as illustrated in FIG. 4, controlling the display screen to respond according to the ambient light intensity value at block S130 may include actions illustrated in following blocks.

At block S133, a preset adjustment value of ambient light intensity is obtained according to a color of the predetermined picture.

At block S134, the ambient light intensity value is adjusted according to the preset adjustment value of ambient light intensity to obtain an adjusted ambient light intensity value.

At block S135, the display screen is controlled to respond according to the adjusted ambient light intensity value.

The predetermined picture may be a pure color picture of different colors. For example, the predetermined picture may be a black picture, a gray picture, a white picture, or the like. Different preset adjustment values of ambient light intensity may be preset for pictures of different colors. For example, preset adjustment values of ambient light intensity may be preset as 5 for the black picture, 10 for the gray picture, and 15 for the white picture.

The electronic device may obtain corresponding preset adjustment values of ambient light intensity according to the predetermined picture displayed in the preset region of the display screen. The ambient light intensity value is adjusted according to the preset adjustment value of ambient light intensity to obtain the adjusted ambient light intensity value, and the display screen is controlled to respond according to the adjusted ambient light intensity value.

Figure 5:
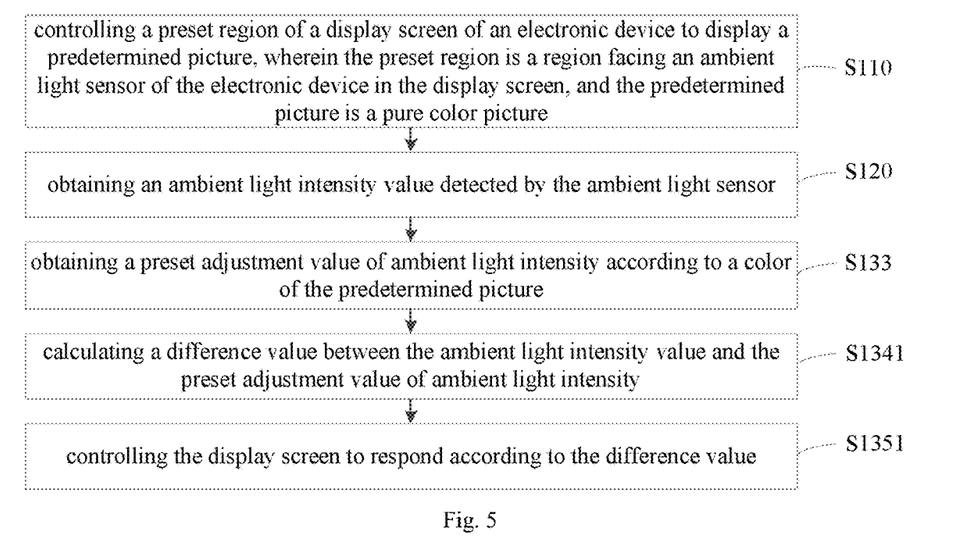
FIG. 5 is a flow chart of a method for detecting ambient light intensity according to another embodiment of the present disclosure.

In some embodiments, as illustrated in FIG. 5, adjusting the ambient light intensity value according to the preset adjustment value of ambient light intensity to obtain the adjusted ambient light intensity value at block S134 may include actions illustrated in following blocks.

At block S1341, a difference value between the ambient light intensity value and the preset adjustment value of ambient light intensity is calculated.

Controlling the display screen to respond according to the adjusted ambient light intensity value at block S135 may include follows.

At block S1351, the display screen is controlled to respond according to the difference value.

After the electronic device obtains the preset adjustment value of ambient light intensity, the electronic device calculates the difference value between the ambient light intensity value detected by the ambient light sensor and the preset adjustment value of ambient light intensity, and controls the display screen to respond according to the difference value.

For example, the ambient light intensity value detected by the ambient light sensor is 80, the preset adjustment value of ambient light intensity obtained by the electronic device is 10, and the difference value calculated is 70. The electronic device determines the ambient light intensity according to the difference value 70. For example, the electronic device determines the ambient light intensity as 70. Then the electronic device controls the display screen to respond according to the difference value, such as reducing brightness of the display screen.

In detail implementation, the present disclosure is not limited by the order of execution of the various steps described, and in the event that no conflict occurs, certain steps may be performed in other sequences or simultaneously.

It can be seen that, the method for detecting ambient light intensity provided in embodiments of the present disclosure includes: controlling the preset region of the display screen to display the predetermined picture, obtaining the ambient light intensity value detected by the ambient light sensor, and controlling the display screen to respond according to the ambient light intensity value. The preset region is the region facing the ambient light sensor in the display screen. The predetermined picture is the pure color picture. With the method for detecting ambient light intensity provided in embodiments of the present disclosure, the preset region of the display screen is controlled to display the predetermined picture, such that light emitted from the preset region to into the ambient light sensor is reduced. Thus, influence of the display screen on the ambient light sensor may be reduced, and accuracy of the ambient light sensor detection may be improved.

Embodiments of the present disclosure further provide an apparatus for detecting ambient light intensity. The apparatus for detecting ambient light intensity may be integrated in an electronic device. The electronic device may be a smart phone, a tablet computer, or the like. The electronic device may be the electronic device 100 in any one of above mentioned embodiments.

Figure 8:
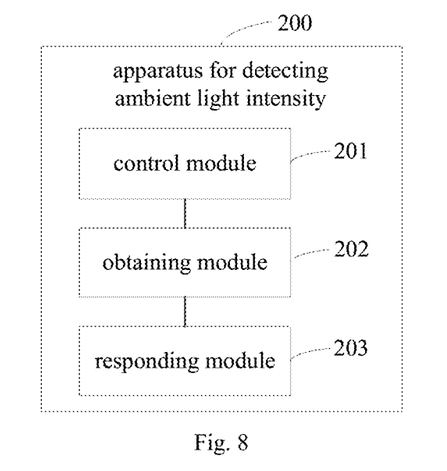
FIG. 8 is a block diagram illustrating an apparatus for detecting ambient light intensity according to an embodiment of the present disclosure.

As illustrated in FIG. 8, the apparatus 200 for detecting ambient light intensity may include: a control module 201, an obtaining module 202, and a responding module 203.

The control module 201 is configured to control a preset region of the display screen to display a predetermined picture. The preset region is a region facing the ambient light sensor in the display screen, and the predetermined picture is a pure color picture.

The preset region may be preset on the display screen of the electronic device. The preset region is the region facing the ambient light sensor in the display screen. For example, the preset region may be located at the top left corner of the display region. At this time, the ambient light sensor in the electronic device is set facing the preset region. In some embodiment, the preset region may also be located at other position in the display region.

The control module 201 may control the display region of the display screen to display the predetermined picture. The predetermined picture is an image or a partial image preset in the electronic device. Color of any two points in the predetermined picture is the same. That is, the predetermined picture is a pure color picture, and color of all parts of the predetermined picture is the same. In some embodiments, the predetermined picture may be a full black image, and the color of the predetermined picture is black.

In some embodiments, the control module 201 may control the preset region of the display screen to display the predetermined picture when there is a need to detect the ambient light intensity. In some embodiments, the control module 201 may also control the preset region of the display screen to display the predetermined picture all the time.

The obtaining module 202 is configured to obtain an ambient light intensity value detected by the ambient light sensor.

When the preset region of the display screen of the electronic device displays the predetermined picture, the ambient light sensor may detect a current ambient light intensity value. The obtaining module 202 obtains the ambient light intensity value detected by the ambient light sensor.

It should be understood that, when the ambient light sensor detects the ambient light intensity value, external environment light (i.e., visible light) enters the ambient light sensor through the display region of the display screen. When the display region of the display screen displays information, the display screen itself is also illuminated, and light emitted by the display screen is also visible light. The light emitted by the display screen may also enter the ambient light sensor, thus affecting detection result of the ambient light sensor.

It should be understood that, comparing with a situation that the predetermined picture includes a plurality of colors, the preset region of the display screen emits less light when the predetermined picture displayed by the preset region is a pure color picture. When the pure color picture is a full black picture, i.e., the pure color picture is a pure black picture, the preset region of the display screen emits the least amount of light, so that the display screen has the least influence on the ambient light sensor.

When the control module 201 controls the preset region of the display screen to display the predetermined picture, such as a black picture, the light emitted by the preset region may be minimized to enter the ambient light sensor. Thereby, the influence of the display screen on the ambient light sensor can be reduced, and the accuracy of the ambient light sensor detection can be improved.

The responding module 203 is configured to control the display screen to respond according to the ambient light intensity value.

After the obtaining module 202 obtains the ambient light intensity value detected by the ambient light sensor, the responding module 203 may determine light intensity of external environment according to the ambient light intensity value. The responding module 203 may control the display screen to respond according to the ambient light intensity value. For example, the responding module 203 may control brightness of the display screen according to the light intensity of external environment, such that the brightness of the display screen is adapted to the external environment light.

In some embodiments, the number of the ambient light sensor may be at least two. The at least two ambient light sensors may be spaced apart from each other. The obtaining module 202 is configured to perform obtaining an ambient light intensity value detected by each ambient light sensor.

The responding module 203 is configured to perform calculating an average value of the ambient light intensity values detected by the at least two ambient light sensors and controlling the display screen to respond according to the average value.

The electronic device includes at least two ambient light sensors. The at least two ambient light sensors are spaced apart from each other.

The obtaining module 202 may obtain an ambient light intensity value detected by each ambient light sensor. The responding module 203 calculates the average value of the ambient light intensity values detected by the at least two ambient light sensors, and controls the display screen to respond according to the average value.

For example, the intensity values of the two ambient light sensors are 70 and 80. The average value of the intensity values of the two ambient light sensors is 75. The responding module 203 determines the ambient light intensity according to the average value 75. For example, the ambient light intensity is determined as the average value 75. The responding module 203 controls the display screen to respond according to the average value, for example, reducing brightness of the display screen.

In some embodiments, the number of the ambient light sensors included in the electronic device may be three, four or other number. The plurality of ambient light sensor included in the electronic device are spaced apart from each other.

In some embodiments, the display region of the display screen includes a first part and a second part disposed oppositely. It should be understood that, the first part may locate at the top of the display screen, and the second part may locate at the bottom of the display screen. One of the two ambient light sensors included in the electronic device may be disposed facing an edge of the first part, and the other one may be disposed facing an edge of the second part. For example, one of the two ambient light sensors included in the electronic device may be disposed facing the top left corner, and the other one may be disposed facing the lower right corner of the display region.

In some embodiments, the responding module 203 is configured to perform follows.

A preset adjustment value of ambient light intensity is obtained according to a color of the predetermined picture.

The ambient light intensity value is adjusted according to the preset adjustment value of ambient light intensity to obtain an adjusted ambient light intensity value.

The display screen is controlled to respond according to the adjusted ambient light intensity value.

The predetermined picture may be a pure color picture of different colors. For example, the predetermined picture may be a black picture, a gray picture, a white picture, or the like. Different preset adjustment values of ambient light intensity may be preset for pictures of different colors. For example, preset adjustment values of ambient light intensity may be preset as 5 for the black picture, 10 for the gray picture, and 15 for the white picture.

The responding module 203 may obtain corresponding preset adjustment values of ambient light intensity according to the predetermined picture displayed in the preset region of the display screen. The ambient light intensity value is adjusted according to the preset adjustment value of ambient light intensity to obtain the adjusted ambient light intensity value, and the display screen is controlled to respond according to the adjusted ambient light intensity value.

In some embodiments, when adjusting the ambient light intensity value according to the preset adjustment value of ambient light intensity to obtain the adjusted ambient light intensity value, the responding module 203 is configured to perform calculating a difference value between the ambient light intensity value and the preset adjustment value of ambient light intensity.

When controlling the display screen to respond according to the adjusted ambient light intensity value, the responding module 203 is configured to perform controlling the display screen to respond according to the difference value.

After the responding module 203 obtains the preset adjustment value of ambient light intensity, the responding module 203 calculates the difference value between the ambient light intensity value detected by the ambient light sensor and the preset adjustment value of ambient light intensity, and controls the display screen to respond according to the difference value.

For example, the ambient light intensity value detected by the ambient light sensor is 80, the preset adjustment value of ambient light intensity obtained by the responding module 203 is 10, and the difference value calculated is 70. The responding module 203 determines the ambient light intensity according to the difference value 70. For example, the electronic device determines the ambient light intensity as 70. Then the responding module 203 controls the display screen to respond according to the difference value, such as reducing brightness of the display screen.

In detail implementation, each of the above modules may be implemented as a separate entity, or may be implemented in any combination as one or several entities.

It can be seen that, with the apparatus 200 for detecting ambient light intensity provided in embodiments of the present disclosure, the preset region of the display screen is controlled to display the predetermined picture via the control module 201, the ambient light intensity value detected by the ambient light sensor is obtained via the obtaining module 202, and the display screen is controlled to respond according to the ambient light intensity value via the responding module 203. The preset region is the region facing the ambient light sensor in the display screen, and the predetermined picture is the pure color picture. With the apparatus for detecting ambient light intensity provided in embodiments of the present disclosure, the preset region of the display screen is controlled to display the predetermined picture, such that light emitted from the preset region to into the ambient light sensor is reduced. Thus, influence of the display screen on the ambient light sensor may be reduced, and accuracy of the ambient light sensor detection may be improved.

Figure 9:
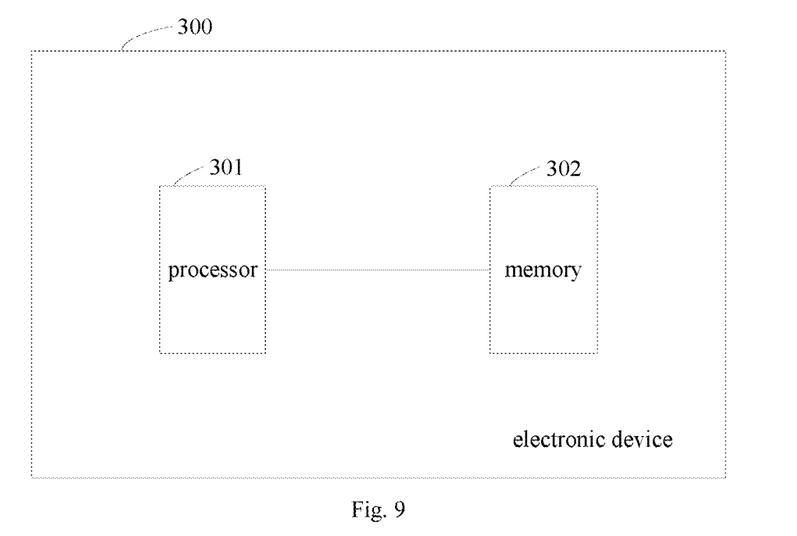
FIG. 9 is a schematic diagram of an electronic device according to another embodiment of the present disclosure.

Embodiments of the present disclosure further provide an electronic device. The electronic device may be a smart phone, a tablet computer, or the like. The electronic device may include a display screen and an ambient light sensor. The ambient light sensor may be disposed facing a display region in the display screen. As illustrated in FIG. 9, the electronic device 300 includes a processor 301 and a memory 302. The processor 301 is electrically coupled to the memory 302.

The processor 301 is a control center of the electronic device 300, which connects various parts of the entire electronic device using various interfaces and lines, executes various functions of the electronic and processes data by running or calling a computer program stored in the memory 302, and calling data stored in the memory 302, so as to realize overall monitoring of the electronic device.

In an embodiment, the processor 301 of the electronic device 300 may load an instruction corresponding to a process of one or more computer program to the memory 302, and run the computer program stored in the memory 302, so as to realize various functions as follows.

A preset region of the display screen is controlled to display a predetermined picture. The preset region is a region facing the ambient light sensor in the display screen, and the predetermined picture is a pure color picture.

An ambient light intensity value detected by the ambient light sensor is obtained.

The display screen is controlled to respond according to the ambient light intensity value.

In some embodiments, the number of the ambient light sensor is at least two. The at least two ambient light sensors may be spaced apart from each other. When obtaining the ambient light intensity value detected by the ambient light sensor, the processor 301 is configured to perform follows.

An ambient light intensity value detected by each ambient light sensor is obtained.

When controlling the display screen to respond according to the ambient light intensity value, the processor 301 is configured to perform follows.

An average value of the ambient light intensity values detected by the at least two ambient light sensors is calculated.

The display screen is controlled to respond according to the average value.

In some embodiments, the display region of the display screen includes a first part and a second part disposed oppositely. One of the two ambient light sensors included in the electronic device may be disposed facing an edge of the first part, and the other one may be disposed facing an edge of the second part.

In some embodiments, when controlling the display screen to respond according to the ambient light intensity value, the processor 301 is configured to perform follows.

A preset adjustment value of ambient light intensity is obtained according to a color of the predetermined picture.

The ambient light intensity value is adjusted according to the preset adjustment value of ambient light intensity to obtain an adjusted ambient light intensity value.

The display screen is controlled to respond according to the adjusted ambient light intensity value.

In some embodiments, when adjusting the ambient light intensity value according to the preset adjustment value of ambient light intensity to obtain the adjusted ambient light intensity value, the processor 301 is configured to perform follows.

A difference value between the ambient light intensity value and the preset adjustment value of ambient light intensity is calculated.

When controlling the display screen to respond according to the adjusted ambient light intensity value, the processor 301 is configured to perform follows.

The display screen is controlled to respond according to the difference value.

In some embodiments, the ambient light sensor is disposed facing an edge of the display region.

In some embodiments, a color of the predetermined picture is black.

The memory 302 is configured to store computer programs and data. The computer programs stored in the memory 302 include instructions executable in the processor. The computer programs may be combined into various functional modules. The processor 301 executes various functional applications and data processing by calling the computer programs stored in the memory 302.

Figure 10:
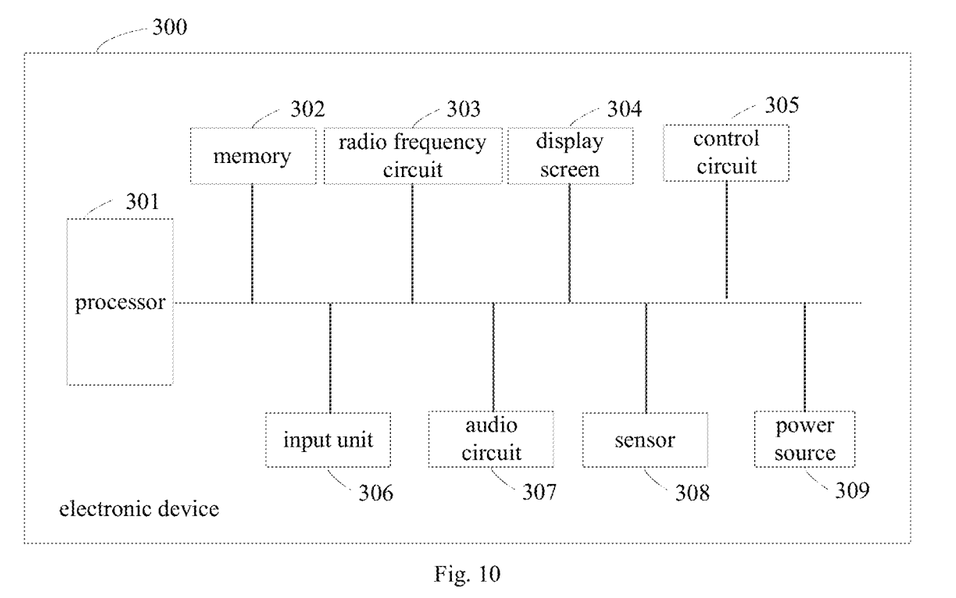
FIG. 10 is a schematic diagram of an electronic device according to another embodiment of the present disclosure.

In some embodiments, as illustrated in FIG. 10, the electronic device 300 further includes a radio frequency circuit 303, a display screen 304, a control circuit 305, an input unit 306, an audio circuit 307, a sensor 308, and a power source 309. The processor 301 is electrically coupled to the radio frequency circuit 303, the display screen 304, the control circuit 305, the input unit 306, the audio circuit 307, the sensor 308, and the power source 309, respectively.

The radio frequency circuit 303 is configured to receive and send a radio-frequency signal, to communicate with a network device or other electronic device through wireless communication.

The display screen 304 may be configured to display information entered by a user or information provided to the user and various graphical user interfaces of the electronic device, which may be composed of images, text, icons, video, and any combination thereof.

The control circuit 305 is electrically coupled to the display screen 304, configured to control the display screen 304 to display information.

The input unit 306 may be configured to receive input digits, character information, or user characteristic information (e.g., fingerprints), and to generate keyboard, mouse, joystick, optical, or trackball signal inputs related to user settings and function controls. The input unit 306 may include a fingerprint recognition module.

The audio circuit 307 may provide an audio interface between the user and the electronic device through a speaker and a microphone.

The sensor 308 is configured to collect external environment information. The sensor 308 may include one or more of ambient brightness sensors, acceleration sensors, gyroscopes, and the like.

The power source 309 is configured to provide power for various components of the electronic device 300. In some embodiments, the power source 309 may be logically coupled to the processor 301 through a power management system to enable functions such as managing charging, discharging, and power management through the power management system.

Although not shown in FIG. 10, the electronic device 300 may further include a camera, a Bluetooth module, and the like, and details are not described herein again.

It can be seen that, embodiments of the present disclosure provide an electronic device. The electronic device is configured to perform: controlling the preset region of the display screen to display the predetermined picture, obtaining the ambient light intensity value detected by the ambient light sensor, and controlling the display screen to respond according to the ambient light intensity value. The preset region is the region facing the ambient light sensor in the display screen, and the predetermined picture is the pure color picture. With the electronic device provided in embodiments of the present disclosure, the preset region of the display screen is controlled to display the predetermined picture, such that light emitted from the preset region to into the ambient light sensor is reduced. Thus, influence of the display screen on the ambient light sensor may be reduced, and accuracy of the ambient light sensor detection may be improved.

Embodiments of the present disclosure further provide a storage medium. The storage medium has stored therein one or more computer programs. When the one or more computer programs is performed by a computer, the computer is configured to perform the above method for detecting ambient light intensity.

It should be noted that, one of ordinary skilled in the art will appreciate that all or part of the steps in various methods of the above-described embodiments can be accomplished by a computer program that instructs related hardware. The computer program may be stored in a computer readable storage medium. The storage medium may include, but is not limited to, a read only memory (ROM), a random access memory (RAM), a magnetic disk, or an optical disk.

The method, apparatus, storage medium and electronic device for detecting ambient light intensity provided by the embodiments of the present disclosure are described in detail. The principles and implementations of the present disclosure are described in the specific examples. The description of the above embodiments is only for understanding the method and its core idea of the present disclosure. At the same time, for those skilled in the art, there will be changes in the specific implementation and the application scope according to the idea of the present disclosure. In conclusion, the content of the specification should not be construed as limiting the present disclosure.

What is claimed is:

1. A method for detecting ambient light intensity, comprising:

controlling a part of a display screen of an electronic device to display one of a pure white picture, a pure gray picture and a pure black picture, and controlling other parts of the display screen to display a user interface, wherein the part of the display screen faces an ambient light sensor of the electronic device;

obtaining an ambient light intensity value detected by the ambient light sensor; and controlling the display screen to respond according to the ambient light intensity value, comprising:

depending on the pure white picture, the gray picture or the pure black picture displayed on the part of the display screen, determining one of a first adjustment value corresponding to the pure white picture, a second adjustment value corresponding to the pure gray picture and a third adjustment value corresponding to the pure black picture as a preset adjustment value of ambient light intensity, wherein the first, the second and the third adjustment values are different from each other;

adjusting the ambient light intensity value according to the preset adjustment value of ambient light intensity to obtain an adjusted ambient light intensity value; and controlling the display screen to respond according to the adjusted ambient light intensity value.

2. The method according to claim 1, wherein the ambient light sensor comprises at least two ambient light sensors, the at least two ambient light sensors are spaced apart from each other, obtaining the ambient light intensity value detected by the ambient light sensor comprises:

obtaining an ambient light intensity value detected by each ambient light sensor; and controlling the display screen to respond according to the ambient light intensity value comprises:

calculating an average value of the ambient light intensity values detected by the at least two ambient light sensors; and controlling the display screen to respond according to the average value.

3. The method according to claim 1, wherein the ambient light sensor comprises two ambient light sensors, the part of the display screen comprises a first region and a second region disposed close to opposite edges of a display region of the display screen, one of the two ambient light sensors is disposed facing the first region, and the other one of the two ambient light sensors is disposed facing the second region.

4. The method according to claim 1, wherein adjusting the ambient light intensity value according to the preset adjustment value of ambient light intensity to obtain the adjusted ambient light intensity value comprises:

calculating a difference value between the ambient light intensity value and the preset adjustment value of ambient light intensity;

controlling the display screen to respond according to the adjusted ambient light intensity value comprises:

controlling the display screen to respond according to the difference value.

5. The method according to claim 1, wherein the ambient light sensor is disposed facing an edge of a display region of the display screen.

6. The method according to claim 1, wherein controlling the display screen to respond according to the ambient light intensity value comprises:

adjusting brightness of the display screen according to the ambient light intensity value.

7. The method according to claim 1, wherein controlling the part of the display screen of the electronic device to display one of the pure white picture, the pure gray picture and the pure black picture comprises:

controlling the part to display one of the pure white picture, the pure gray picture and the pure black picture in response to a triggering event.

8. The method according to claim 1, wherein controlling the part of the display screen of the electronic device to display one of the pure white picture, the pure gray picture and the pure black picture comprises:

controlling the part to display one of the pure white picture, the pure gray picture and the pure black picture all the time.

9. A non-transitory computer readable storage medium, having stored therein one or more computer programs, when the one or more computer programs is performed by a computer, the computer is configured to perform a method for detecting ambient light intensity, wherein the method for detecting ambient light intensity comprises:

controlling a part of a display screen of an electronic device to display one of the pure white picture, the pure gray picture and the pure black picture, and controlling other parts of the display screen to display a user interface, wherein the part of the display screen faces an ambient light sensor of the electronic device in the display screen;

obtaining an ambient light intensity value detected by the ambient light sensor; and controlling the display screen to respond according to the ambient light intensity value, comprising:

depending on the pure white picture, the gray picture or the pure black picture displayed on the part of the display screen, determining one of a first adjustment value corresponding to the pure white picture, a second adjustment value corresponding to the pure gray picture and a third adjustment value corresponding to the pure black picture as a preset adjustment value of ambient light intensity, wherein the first, the second and the third adjustment values are different from each other;

adjusting the ambient light intensity value according to the preset adjustment value of ambient light intensity to obtain an adjusted ambient light intensity value; and controlling the display screen to respond according to the adjusted ambient light intensity value.

10. The non-transitory computer readable storage medium according to claim 9, wherein the ambient light sensor comprises at least two ambient light sensors, the at least two ambient light sensors are spaced apart from each other, obtaining the ambient light intensity value detected by the ambient light sensor comprises:

obtaining an ambient light intensity value detected by each ambient light sensor; and controlling the display screen to respond according to the ambient light intensity value comprises:

calculating an average value of the ambient light intensity values detected by the at least two ambient light sensors; and controlling the display screen to respond according to the average value.

11. The non-transitory computer readable storage medium according to claim 9, wherein the ambient light sensor comprises two ambient light sensors, the part of the display screen comprises a first region and a second region disposed close to opposite edges of a display region of the display screen, one of the two ambient light sensors is disposed facing the first region, and the other one of the two ambient light sensors is disposed facing the second region.

12. The non-transitory computer readable storage medium according to claim 9, wherein adjusting the ambient light intensity value according to the preset adjustment value of ambient light intensity to obtain the adjusted ambient light intensity value comprises:

calculating a difference value between the ambient light intensity value and the preset adjustment value of ambient light intensity;

controlling the display screen to respond according to the adjusted ambient light intensity value comprises:

controlling the display screen to respond according to the difference value.

13. An electronic device, comprising:

a display screen, comprising a display region;

an ambient light sensor, disposed facing the display region of the display screen; and a processor, configured to control a part of the display screen to display one of a pure white picture, a pure gray picture and a pure black picture when the ambient light sensor detects ambient light intensity, and control other parts of the display screen to display a user interface;

wherein the processor is further configured to control the display screen to respond according to the ambient light intensity value by:

depending on the pure white picture, the gray picture or the pure black picture displayed on the part of the display screen, determining one of a first adjustment value corresponding to the pure white picture, a second adjustment value corresponding to the pure gray picture and a third adjustment value corresponding to the pure black picture as a preset adjustment value of ambient light intensity, wherein the first, the second and the third adjustment values are different from each other;

adjusting the ambient light intensity value according to the preset adjustment value of ambient light intensity to obtain an adjusted ambient light intensity value; and controlling the display screen to respond according to the adjusted ambient light intensity value.

14. The electronic device according to claim 13, wherein the ambient light sensor is disposed facing an edge of the display region.

15. The electronic device according to claim 13, wherein, the ambient light sensor comprises two ambient light sensors, the two ambient light sensors are spaced apart from each other;

the part of the display screen comprises a first region and a second region disposed close to opposite edges of a display region of the display screen, one of the two ambient light sensors is disposed facing the first region, and the other one of the two ambient light sensors is disposed facing the second region.

* * * * *